(No Model.)
E. S. ELLIS.
BRAKE FOR BICYCLES.
No. 555,686.  Patented Mar. 3, 1896.
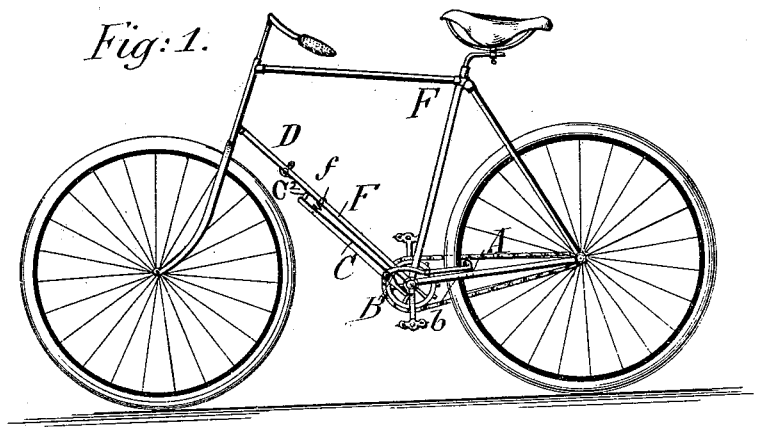
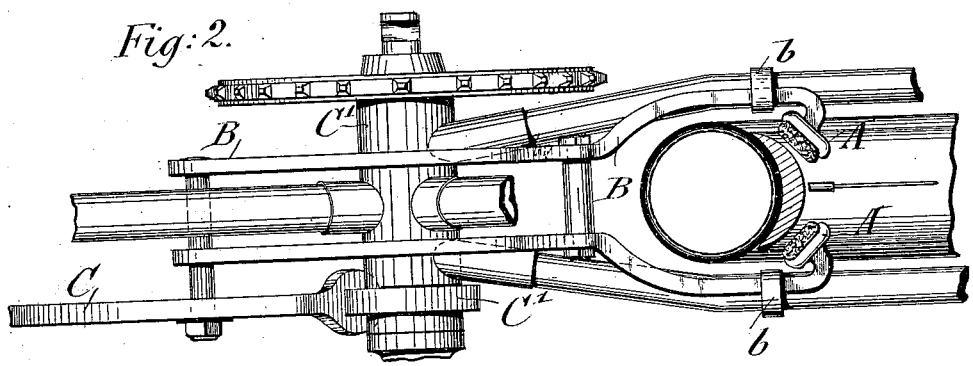
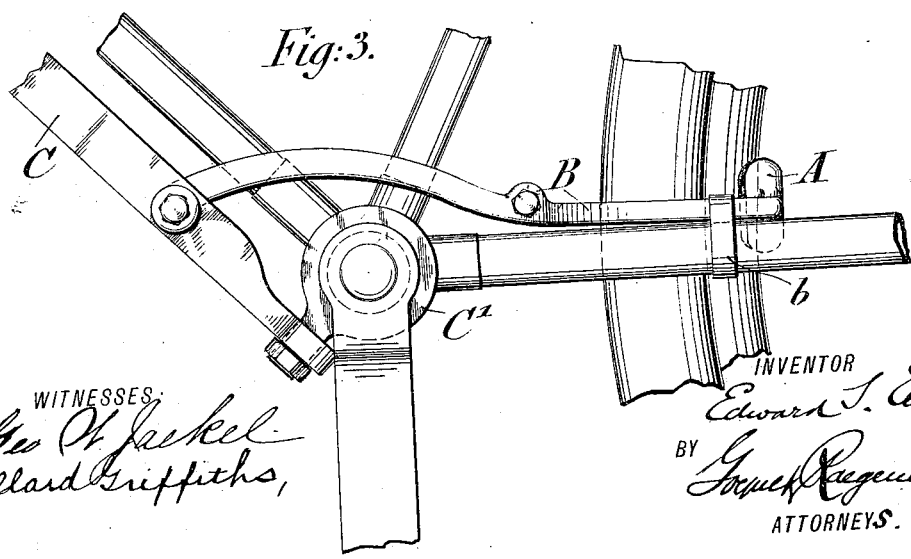
WITNESSES:
Geo H Jackel
Hibbard Griffiths
INVENTOR
Edward S. Ellis
BY
ATTORNEYS.

UNITED STATES PATENT OFFICE.

EDWARD S. ELLIS, OF ENGLEWOOD, NEW JERSEY.

BRAKE FOR BICYCLES.

SPECIFICATION forming part of Letters Patent No. 555,686, dated March 3, 1896.

Application filed November 15, 1895. Serial No. 569,098. (No model.)

*To all whom it may concern:*

Be it known that I, EDWARD S. ELLIS, a citizen of the United States, residing at Englewood, in the county of Bergen and State of New Jersey, have invented certain new and useful Improvements in Brakes for Bicycles, of which the following is a specification.

This invention relates to an improved brake for bicycles which can be readily operated by the foot of the wheelman, so that the brake-shoes are applied at both sides of the rim of the hind wheel, and thereby an effective brake action exerted that can be readily varied to a greater or less extent as required; and the invention consists of a brake for bicycles comprising brake-shoes arranged at each side of the rim of the hind wheel, a forked lever provided with lugs that are guided on the lower part of the frame, a treadle-lever applied loosely to the crank-axle of the pedals and pivotally connected with the forked brake-lever, and a helical spring interposed between the inclined part of the frame and the upper end of the treadle-lever by which the brake-shoes are operated.

The invention consists further of certain details of construction, which will be fully described hereinafter and finally pointed out in the claims.

In the accompanying drawings, Figure 1 is a side elevation of a bicycle with my improved brake applied to the same. Fig. 2 is a plan view of the operating parts of the same, and Fig. 3 is a sectional side view of the parts shown in Fig. 2.

Similar letters of reference indicate corresponding parts.

Referring to the drawings, A A are the brake-shoes which are faced with rubber or other suitable frictional material and which are arranged one on each side of the rim of the hind wheel, so that when they are moved forward they press against the rim. The rim may be covered with rubber, so as to be protected against wear and increase the friction of the brake-shoes.

The brake-shoes A A are applied to a forked lever B, which is guided by means of downwardly-bent lugs or keepers $b$ on the lower part of the frame of the bicycle. The lever B is curved at its front end, so as to extend over the crank-shaft of the pedals, said lever being likewise forked at its front or curved end, so as to permit the inclined portion of the frame to pass through the forked front and rear ends of the same.

The front ends of the forked lever B are pivotally connected with the actuating or treadle lever C, which is bolted at its lower end onto a seat or boss of a loose sleeve C' that is placed on the crank-shaft of the pedals so as to oscillate freely on the same. The upper end of the treadle-lever is connected with the inclined forward-extending portion of the frame F of the bicycle by a strong helical spring $f$, which holds the upper end in position below said frame. It is provided with a laterally-projecting treadle $C^2$ arranged transversely to the treadle-lever C, so that the latter can be readily operated by the foot of the rider.

Above the treadle end of the treadle-lever C is arranged on the upwardly-inclined brace of the frame a stationary foot-rest D, which serves as a support for the toe part of the foot, so that the latter can rest on the cross-piece, while the heel or instep portion of the foot can press with more, or less pressure on the treadle of the treadle-lever.

When the brake is operated by pressing on the treadle of the treadle-lever, the brake-lever B is moved in forward direction, so that the brake-shoes are applied to both sides of the tire, the brake-lever being steadily guided by its lugs or keepers on the lower part of the frame F. The keepers serve for holding the brake-shoes firmly in position and preventing any lateral movement of the same, while steadying the brake-shoes during the forward or backward sliding motion. The brake-lever is drawn forward by the downward motion of the actuating-lever, so that the brake-shoes are applied to the rim and pressed with any required degree of pressure against the rim, so as to retard the motion of the bicycle and finally stop the same. As soon as the feet are returned to the pedals, the helical spring restores the actuating treadle-lever to its normal position below the inclined front brace of the frame. The parts of the brake are intended to be made of sheet-steel, the foot-rest D and treadle $C^2$ being so arranged as to be above the revolving pedals, so that they do not interfere with the latter.

The brake mechanism can be readily applied to all bicycles without requiring any change in construction. This is accomplished by applying the loose sleeve to the crank-shaft of the pedals and screwing the treadle-lever to said sleeve, while the helical spring is fastened to the frame by means of a suitable clip, which is screwed onto the upwardly-inclined brace of the frame.

The advantages of my improved brake are, first, that they are operated by the feet when they are at liberty for such action; second, that the brake acts on the hind wheel, which supports the weight of the rider; third, that the brake acts on the inside of the rim, so that considerable pressure can be applied to the same without injury to the same, and, fourth, that the pressure can be graduated with ease and safety from gentle friction to such a friction that the motion of the hind wheel is entirely arrested.

Having thus described my invention, I claim as new and desire to secure by Letters Patent—

1. The combination with a cycle, of brake-shoes arranged at each side of the rim of the hind wheel, a forked brake-lever to which the shoes are applied, means for guiding said brake-lever at the lower part of the frame of the bicycle, and an actuating treadle-lever pivotally connected with the brake-lever, said brake-lever being connected by a loose sleeve with the crank-axle of the pedals and connected by a helical spring with the frame of the bicycle, substantially as set forth.

2. The combination with a cycle, of a foot-rest applied to the forwardly-inclined brace of the frame, an actuating treadle-lever provided with a treadle below said foot-rest, the lower end of said treadle-lever being applied to a loose sleeve on the pedal-axle, and a forked brake-lever pivoted to the actuating treadle-lever and provided with brake-shoes at its rear end acting on each side of the rim of the hind wheel, said brake-lever being provided with a keeper guided at the lower part of the frame, so as to prevent the lateral movement of the brake-shoes, substantially as set forth.

In testimony that I claim the foregoing as my invention I have signed my name in presence of two subscribing witnesses.

EDWARD S. ELLIS.

Witnesses:
H. BIRTWHISTLE,
WILLIAM HUCKIN.